March 7, 1933.     H. KUDO     1,900,290
DOUGHNUT PAN
Filed Sept. 5, 1931
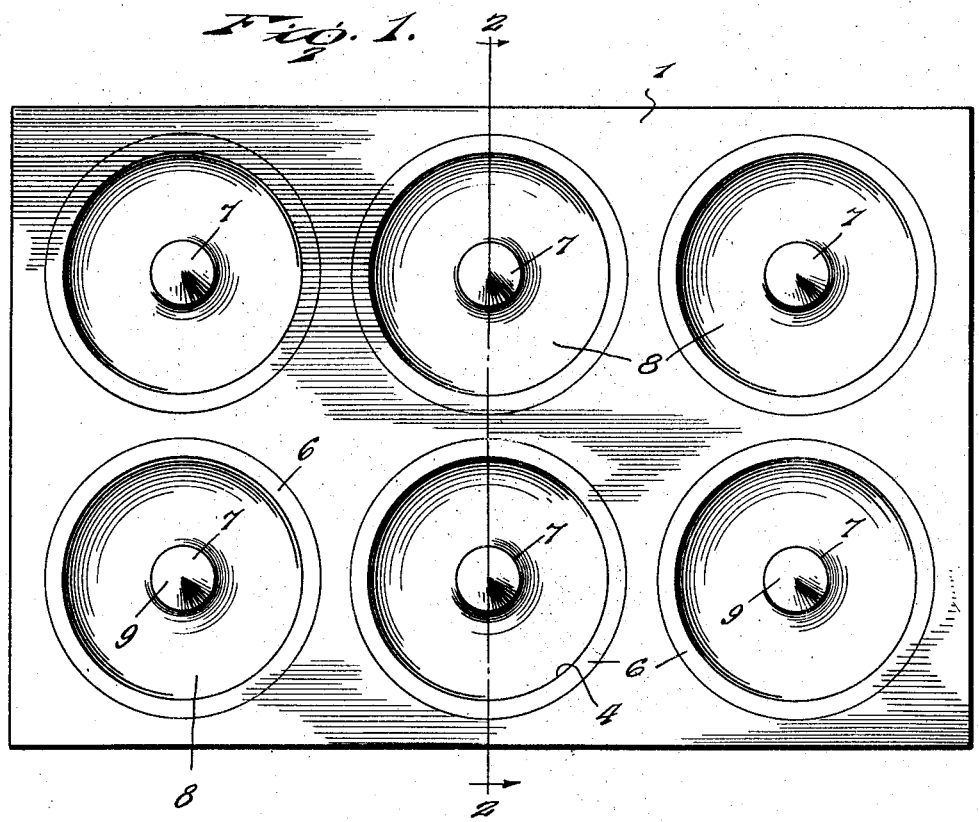
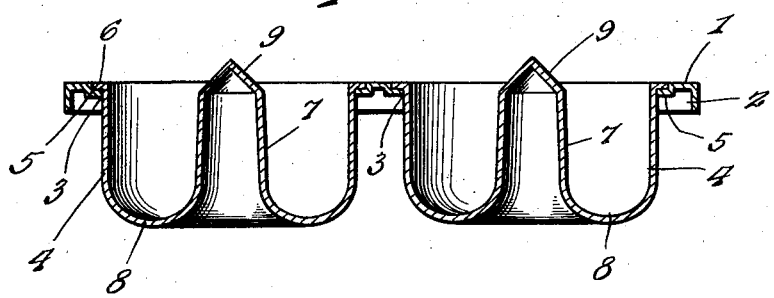
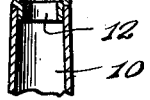
Inventor
H. Kudo.
By Lacey & Lacey,
Attorneys Patented Mar. 7, 1933

1,900,290

UNITED STATES PATENT OFFICE

HAROLD KUDO, OF DUBUQUE, IOWA

DOUGHNUT PAN

Application filed September 5, 1931. Serial No. 561,477.

This invention relates to an improved pan to be used when cooking doughnuts and one object of the invention is to provide a pan having cups in which batter or dough may be poured and doughnuts similar in appearance to an ordinary doughnut cooked by baking in an oven instead of in a pan of grease. It will thus be seen that the doughnuts when baked will be free from grease and may be easily digested.

Another object of the invention is to provide the pan with dough receiving cups having centrally located columns for forming openings in the doughnuts, the columns being of such height that they will extend entirely through the doughnuts when baked and also have their upper ends of such shape that when the batter or dough is poured into the cups it will be prevented from adhering to the columns and remaining upon the upper ends thereof.

The invention is illustrated in the accompanying drawing, wherein:

Figure 1 is a top plan view of the improved doughnut pan,

Figure 2 is a sectional view through the pan taken along the line 2—2 of Figure 1, and Figure 3 is a fragmentary view showing a column of a modified construction.

The improved doughnut pan comprises a supporting frame or plate 1 which may be of any desired length and width and has a depending flange 2 about its margins to reinforce the plate and permit it to be easily lifted. Circular openings 3 are formed in the plate, and seated in these openings are dough receiving cups 4. The cups may be formed of any suitable material but, in actual practice, it has been found that aluminum produces the best results. The metal around the openings 3 is preferably pressed or stamped downwardly to form circular seats 5 which receive annular flanges 6 on the upper edges of the cups, the parts being pressed together firmly so as to form a tight joint and thus prevent accidental displacement of said cups from the supporting frame. It should be noted that the upper surfaces of the flanges 6 are flush with the upper surface of the supporting plate so as to present no obstructions for the lodgment of batter or dough. By this arrangement, the pan may be thoroughly cleaned and cooked doughnuts very easily removed from the cups. Each cup is provided at its center with a column 7 which extends upwardly and is of such height that it projects slightly above the supporting plate 1. The cup is preferably of an even diameter throughout its depth and its bottom 8 is arcuate transversely and merges into the column and side walls, as clearly shown in Fig. 2 of the drawing. Therefore, when batter or dough is poured into a cup, it will assume the shape of a doughnut and since the column is of greater height than the depth of the cup, an opening will be formed entirely through the doughnut even if the batter should rise sufficiently to cause the entire cup to be filled.

The column preferably tapers slightly upwardly, in order that a cooked doughnut may be easily removed, and at its upper end each column is formed with a head or cap 9 which is preferably conical in shape, as shown. Owing to the shape of the head or cap, when batter or dough is poured into a cup, it will not have a tendency to adhere to the column and accumulate upon the upper end thereof.

Before baking, the dough receiving cups are preferably oiled or buttered with a brush or cloth to prevent sticking or adherence of the batter to the walls of the cup, and after each baking operation, the cups may be easily cleaned by wiping the same with a larded or otherwise greased cloth. While it is preferred to have the upper ends of the columns normally closed by conical caps molded or otherwise formed integral with the cups, it has been found desirable in some cases to make these caps detachable. Such a cap is illustrated in Fig. 3 of the drawing. The column 10, shown in Fig. 3, is similar to the column 7 except that it is open at its upper end and its cap 11 is formed separate from the column and provided with a depending flange or collar 12 which fits tightly within the column, as shown. Therefore, this cap will be firmly held in place when applied but may be removed in order that the interior of the column may be thoroughly cleaned when necessary, or, if desired, the cap may be removed after batter has been poured into the cup and hot air permitted to pass upwardly through the column while the doughnuts are being cooked.

It will, of course, be understood that the supporting plate or frame may be provided with any desired number of openings for the reception of dough receiving cups, and suitable handles may be provided to facilitate handling of the device, if found desirable, without departing from the spirit of the invention.

What is claimed is:

1. In a doughnut baking pan, a supporting plate, and a cup secured to and depending from the plate and having annular side walls, a bottom wall, and a column rising from the bottom centrally thereof, the bottom being arcuate transversely and merging into lower portions of the side walls and column, said column having a hollow upper end the walls of which are sharply upwardly inclined with the apex of the column projecting slightly above the plane of the supporting plate.

2. In a doughnut baking pan, an imperforate cup having a column rising from its bottom, the column being hollow and open at its upper and lower ends, the bottom being arcuate transversely and merging into lower portions of the column, and a hollow conical cap for the upper end of said column having its side walls converging upwardly sharply to form a pointed terminal, said cap being provided with a depending flange detachably fitting within the upper end of the column.

3. A doughnut baking pan comprising a supporting plate having a depending marginal reinforcing flange and provided with circular openings surrounded by depressed annular seats, imperforate dough-receiving cups having lateral flanges resting on said annular seats with their upper surfaces disposed flush with the upper surface of the supporting plate, said cups being provided with centrally disposed columns tapering slightly in an upward direction and having their upper ends provided with hollow conical shaped caps the walls of which are sharply inclined upwardly with the apices of said caps projecting slightly above the plane of the upper surface of the supporting plate and forming detachable closures for the upper ends of the columns.

In testimony whereof I affix my signature.

HAROLD KUDO. [L S.]